United States Patent [19]

McGoldrick

[11] Patent Number: 6,010,179
[45] Date of Patent: Jan. 4, 2000

[54] ONE PIECE CARPETED TOPWELL

[75] Inventor: Dale L. McGoldrick, Lake Orion, Mich.

[73] Assignee: Chrysler Corporation, Auburn Hills, Mich.

[21] Appl. No.: 08/923,145

[22] Filed: Sep. 4, 1997

[51] Int. Cl.⁷ ....................................................... B60J 7/20
[52] U.S. Cl. ...................................... 296/107.08; 296/136
[58] Field of Search .............................. 296/107.08, 136, 296/39.1

[56] References Cited

U.S. PATENT DOCUMENTS

| | | | |
|---|---|---|---|
| 4,440,436 | 4/1984 | Giddens et al. | 296/107.08 |
| 5,417,465 | 5/1995 | Koppenstein et al. | 296/39.1 |
| 5,509,712 | 4/1996 | Rausch et al. | 296/124 |
| 5,527,081 | 6/1996 | Rausch et al. | 296/107 |

*Primary Examiner*—Gary C. Hoge
*Attorney, Agent, or Firm*—James R. Yee

[57] ABSTRACT

A one piece topwell assembly that is attached to a structure of a automobile and receives a retracted convertible top is provided. The one piece topwell assembly comprises a needled fabric and a lightweight thermoplastic affixed to the needled fabric, with a tertiary spun bonded polyester laminate, and the needled fabric and lightweight thermoplastic and tertiary spun bonded polyester laminate shaped to form the one piece topwell assembly that is attached to the structure of the automobile and receives the retracted convertible top.

9 Claims, 5 Drawing Sheets

ONE PIECE CARPETED TOPWELL

BACKGROUND OF THE INVENTION

1. Field of the Invention

The present invention relates generally to convertible tops for automotive vehicles and, more particularly, to a one piece carpeted topwell assembly for use in storing an automotive vehicle convertible top when the top is in a lowered or storage position.

2. Description of the Related Art

Convertible tops, i.e. tops that fold back, have been used in the automotive industry for years. The attraction of convertible tops is that they may be raised to cover a passenger compartment of the vehicle during cool or rainy weather and folded down to expose the passenger compartment to an open air atmosphere during periods of warm or sunny weather. When lowered back, the convertible top is stored in an area behind a back seat of the vehicle and in front of a trunk of the vehicle. This area is typically referred to as the topwell or slingwell area. Regardless of the position of the convertible top, i.e. up or down, the topwell area is subject to water accumulation because it is difficult to completely seal a rear window to a fabric convertible top.

Topwells generally have been manufactured either from vinyl that was typically assembled through a cut and sew fashion including snaps, grommets, and plastic extrusions, or from vacuum formed high density polyethylene (HDPE). This multi-piece vinyl or polyethylene topwell configuration has several disadvantages, including complex installation, significant weight, improper fit and finish, low noise dampening capabilities, water leakage along seams, and high cost in manufacturing and assembly. Therefore, there is a need in the art to provide a topwell which provides for easy installation with reduced weight, improved fit and finish, increased noise dampening capabilities, and reduced manufacturing and assembly costs.

SUMMARY OF THE INVENTION

In accordance with the teachings of the present invention, a one piece topwell assembly is provided. The assembly is attached to a structure of an automobile and receives a retracted convertible top. The one piece topwell assembly further comprises a needled fabric and a lightweight thermoplastic affixed to the needled fabric, with the needled fabric and lightweight thermoplastic shaped to form a one piece topwell assembly that is attached to the structure of the automobile and which receives the retracted convertible top.

BRIEF DESCRIPTION OF THE DRAWINGS

Other objects and advantages of the invention will become apparent upon reading the following detailed description and upon reference to the following drawings, in which.

DESCRIPTION OF THE PREFERRED EMBODIMENT

Figure 1:
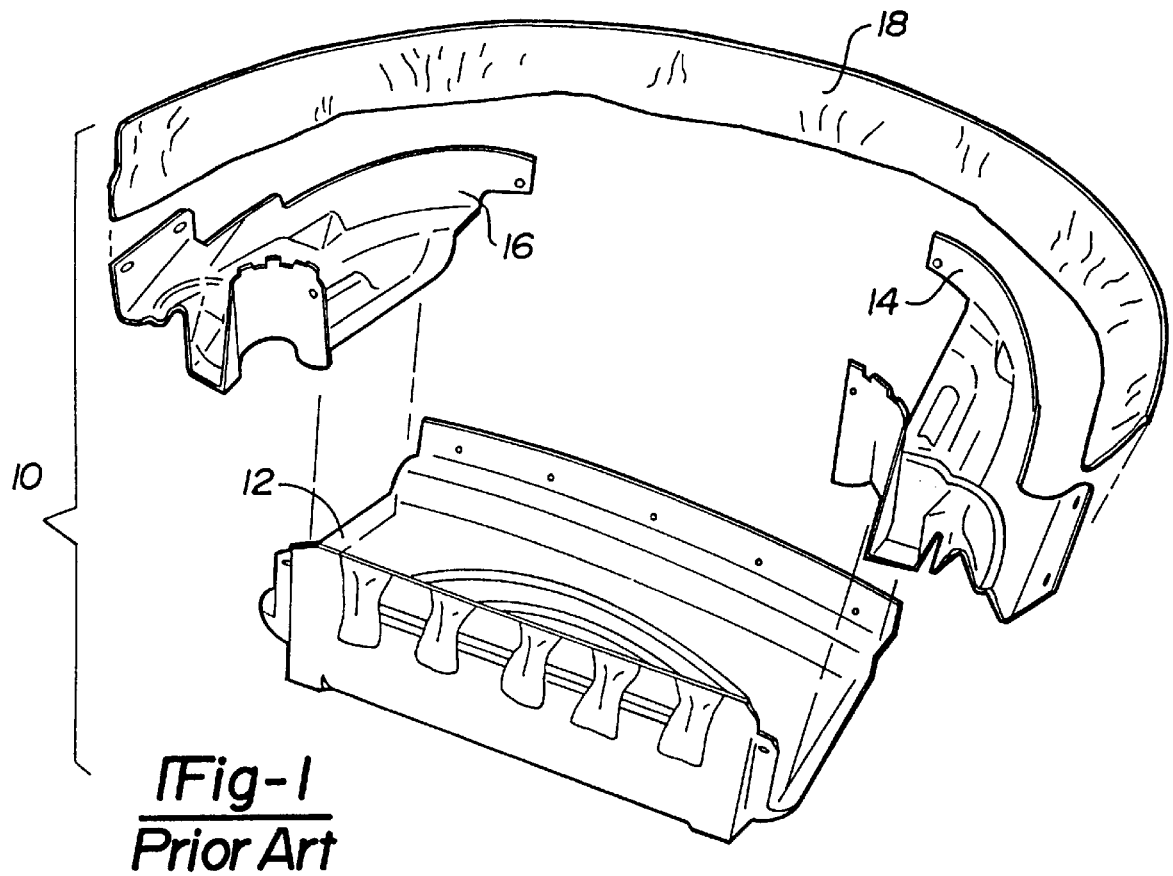
FIG. 1 is an exploded perspective view of a multi-piece topwell assembly of the prior art.
Figure 2:
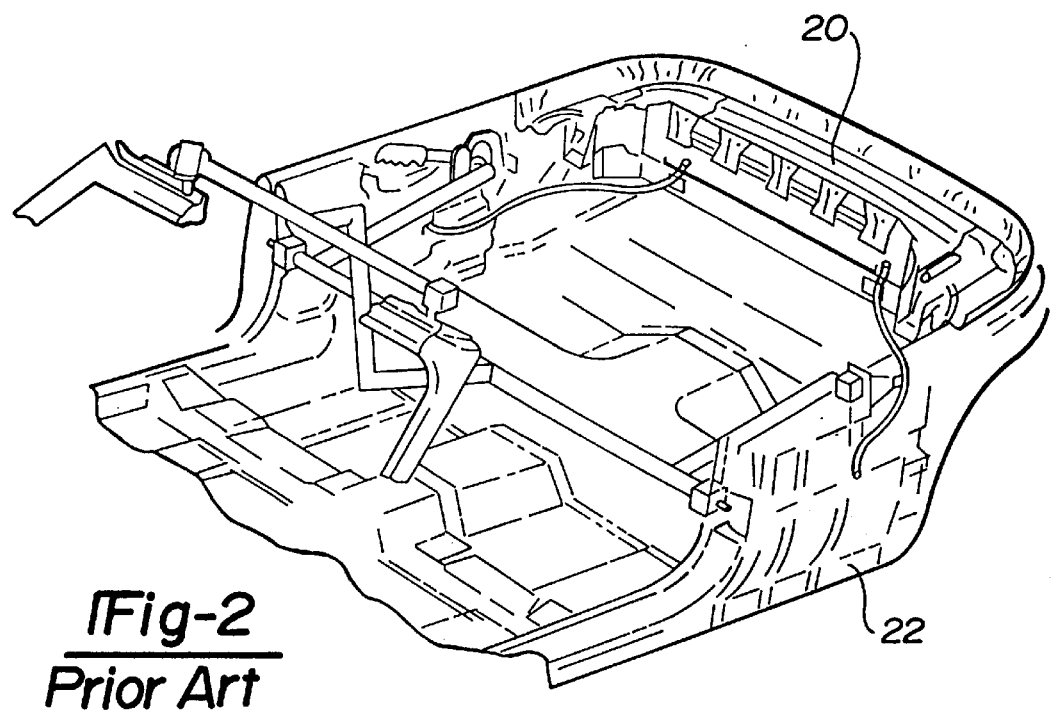
FIG. 2 is a fragmentary perspective view of a convertible vehicle body showing portions of the topwell assembly of FIG. 1.
Figure 3:
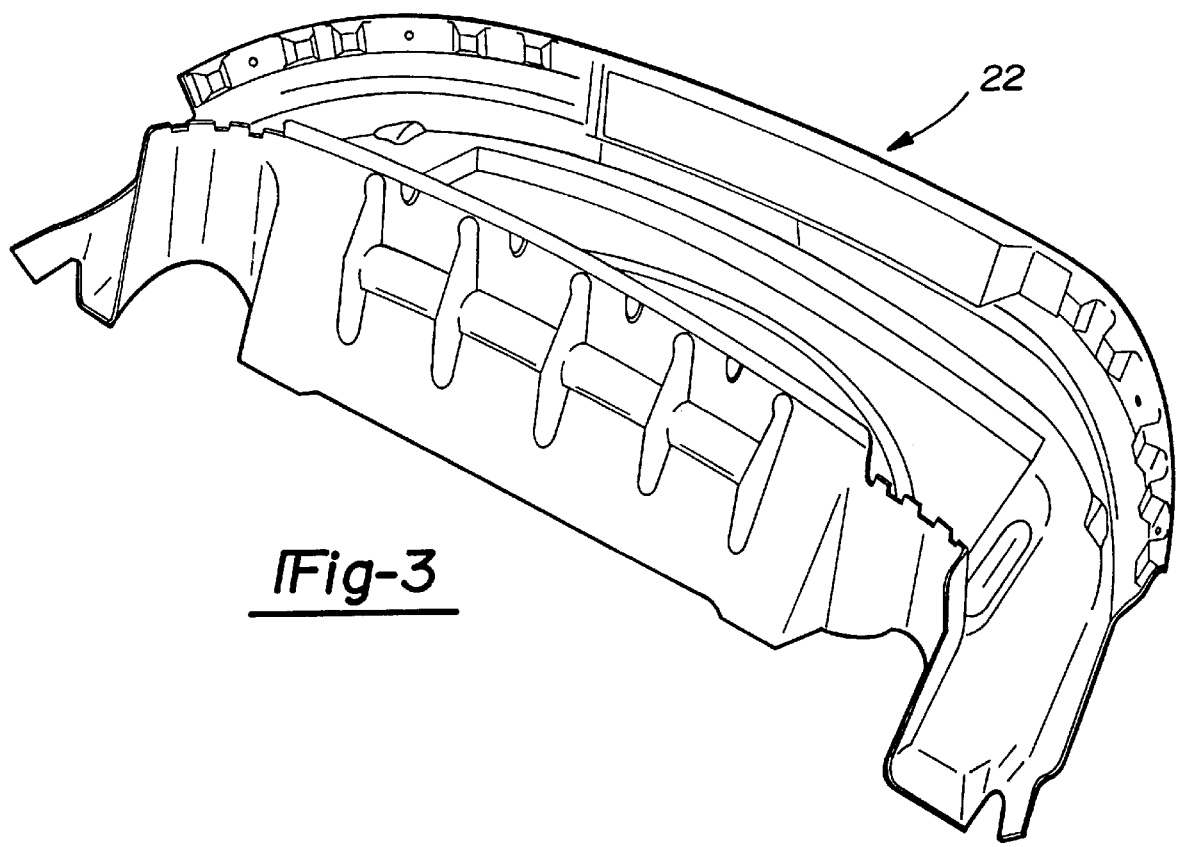
FIG. 3 is a perspective view of a one piece topwell assembly according to the present invention.
Figure 4:
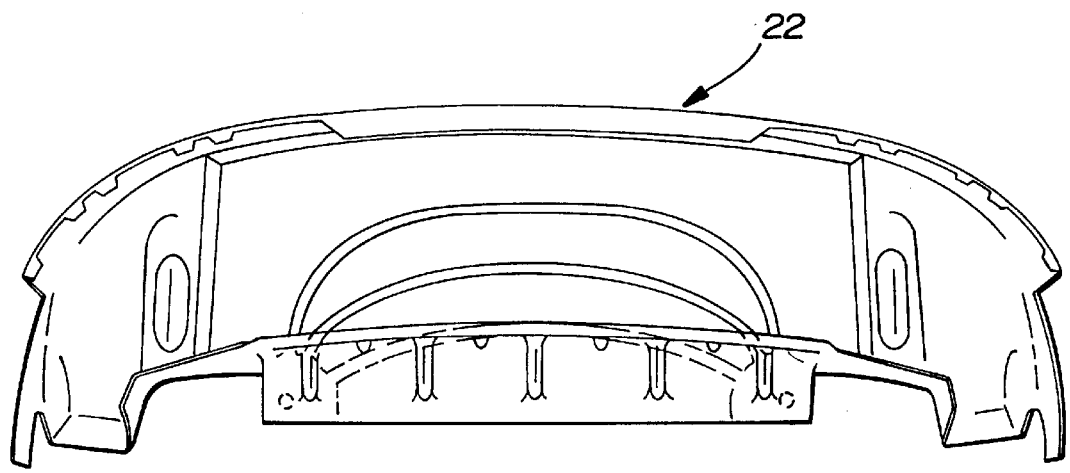
FIG. 4 is a top view of the topwell assembly of FIG. 3.
Figure 5:
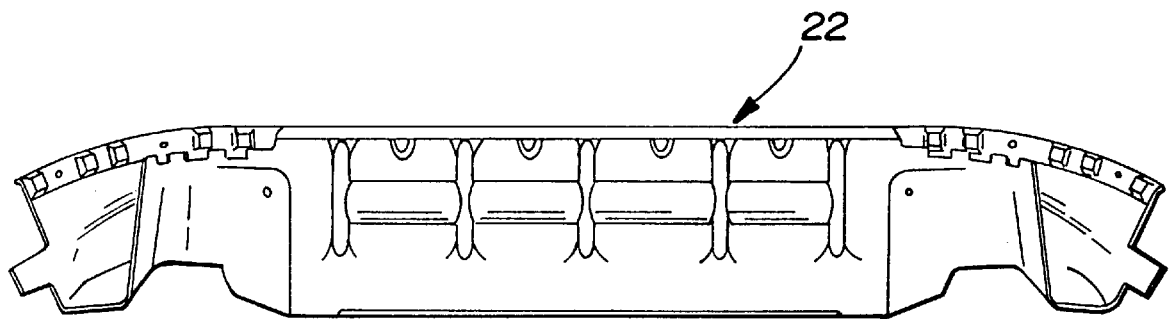
FIG. 5 is a front view of FIG. 3.
Figure 6:
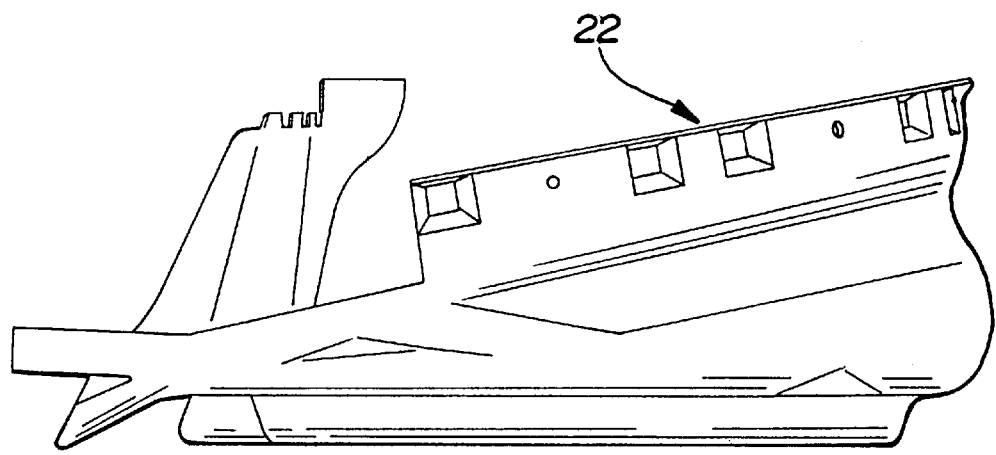
FIG. 6 is a side view of the topwell assembly of FIG. 3.

FIG. 1 and FIG. 2 illustrate a multi-piece topwell assembly 10 of the prior art, which is generally molded from a synthetic resin or plastic material such as polyethylene. Topwell assembly 10 has a traversely extending molded central shell portion 12 interconnecting right hand and left hand side shell portions 14,16 and a half-wall 18. The central shell 12, right hand shell 14, left hand shell 16 and half-wall 18 are combined to form a single unit 20 that is attached to a convertible vehicle body 24, as shown in FIG. 2. Connection of the various pieces of the topwell requires numerous connecting pieces such as clips and fasteners (not shown). An enclosure thus is provided for storing the convertible top when the top is in the down position. It also presents a storage space for luggage or other materials when the top is in the up or covered position.

Figure 7:
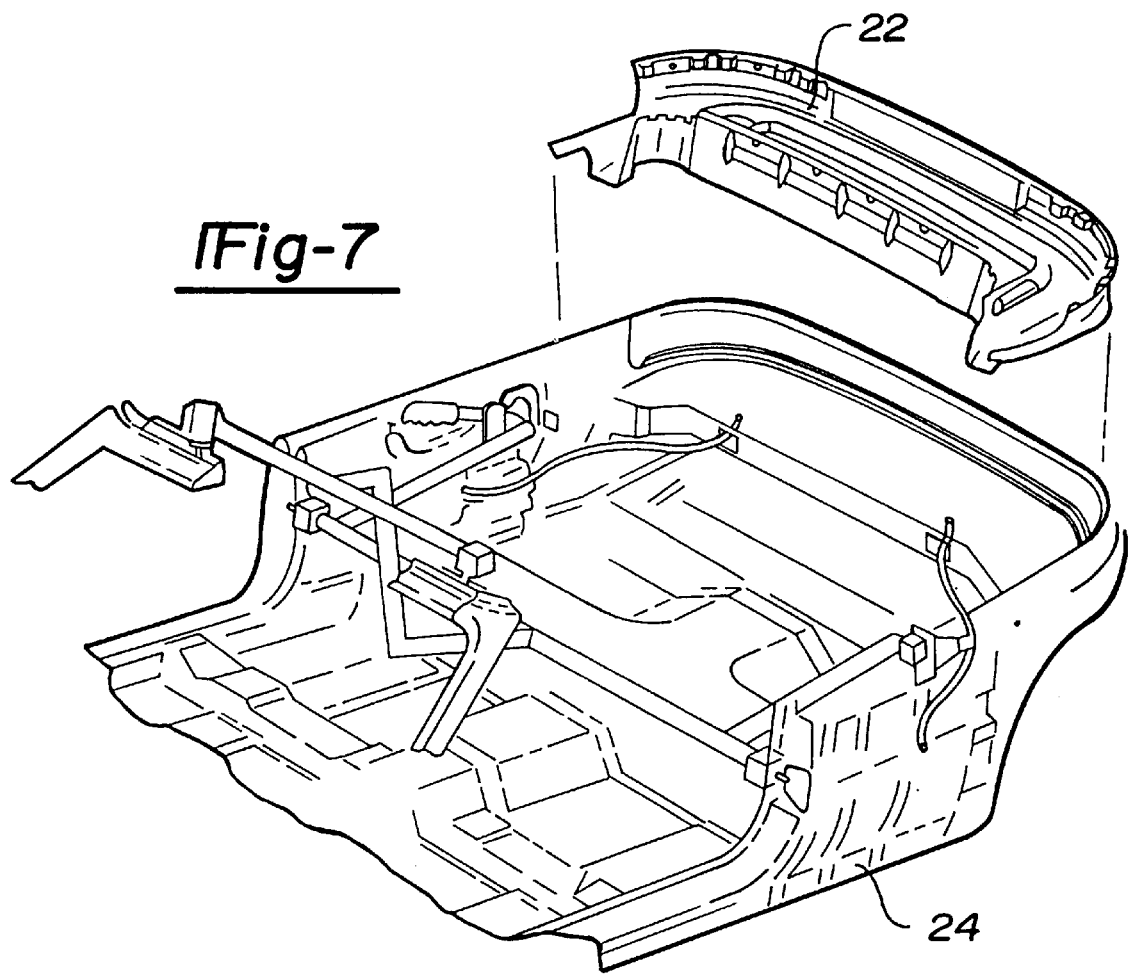
FIG. 7 is the topwell assembly of FIG. 3 illustrated in operational relationship with a fragmentary perspective view of the convertible vehicle body.

Referring to FIGS. 3–6, topwell assembly 22 of the preferred embodiment of the present invention is illustrated. As can be seen, topwell assembly 22 comprises a unitary piece incorporating the central shell portion, right hand shell portion, left hand shell portion, and half-wall. As shown in FIG. 7, topwell 22 can be seated into the vehicle body 24 in a single manufacturing step, substantially reducing assembly complexity and cost. Such complexity and cost further is reduced in that none of the connect pieces are required to connect the various portions of the topwell. This one piece topwell further maximizes the useful storage area behind the rear seat and minimizes the number of gaps, voids, and rattle sources that are generally associated with a multi-piece topwell assembly.

Figure 8:
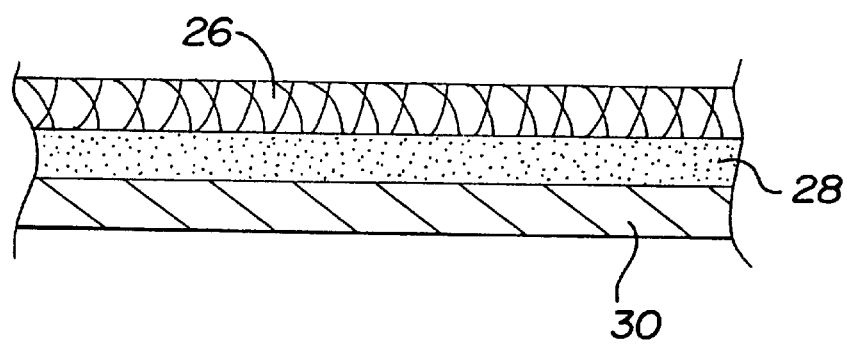
FIG. 8 is a sectional view of the one piece topwell assembly showing the three layered construction of the preferred embodiment of the present invention.

The topwell of the preferred embodiment is composed of three layers. As illustrated in FIG. 8, the topwell has a first layer that is a 9 ounce needled-flat polyester carpet 26. This needled-flat polyester carpet 26 is affixed to an 18 ounce per square yard polyethylene layer 28 and a 90 gram per square meter polyester spun bonded tertiary laminate 30. The topwell is formed by placing the carpet 26 in a compression mold where the mold surfaces are brought together and heated. After a cooling period, the mold surfaces are separated and a unitary topwell is produced. This three layer construction provides a self supporting topwell that is both waterproof and durable.

Figure 9:
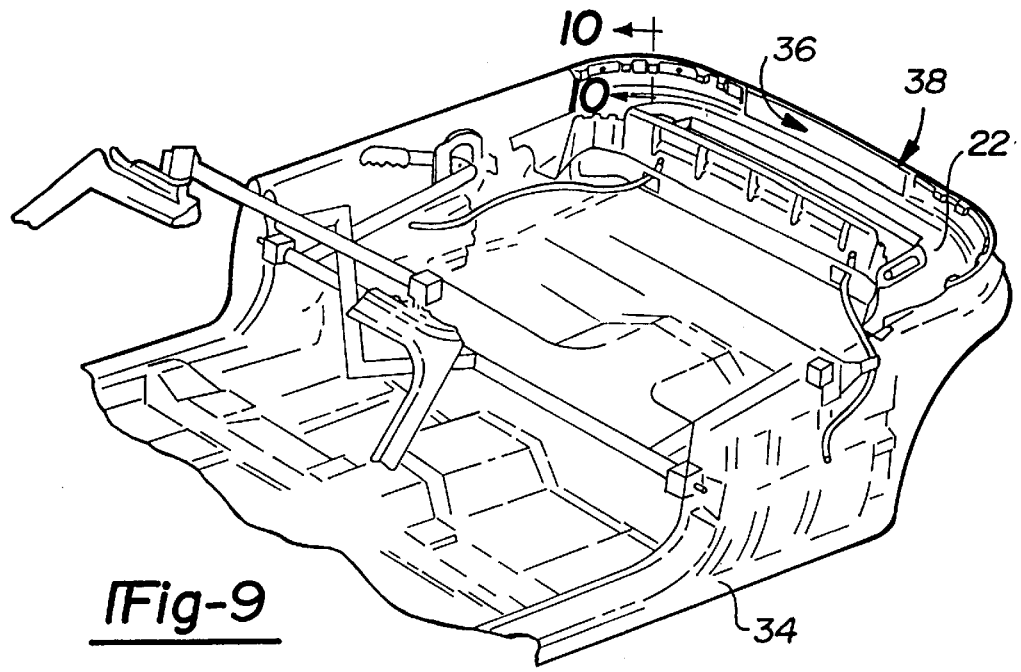
FIG. 9 is a fragmentary perspective view of a convertible vehicle body showing portions of the topwell assembly of FIG. 3.
Figure 10:
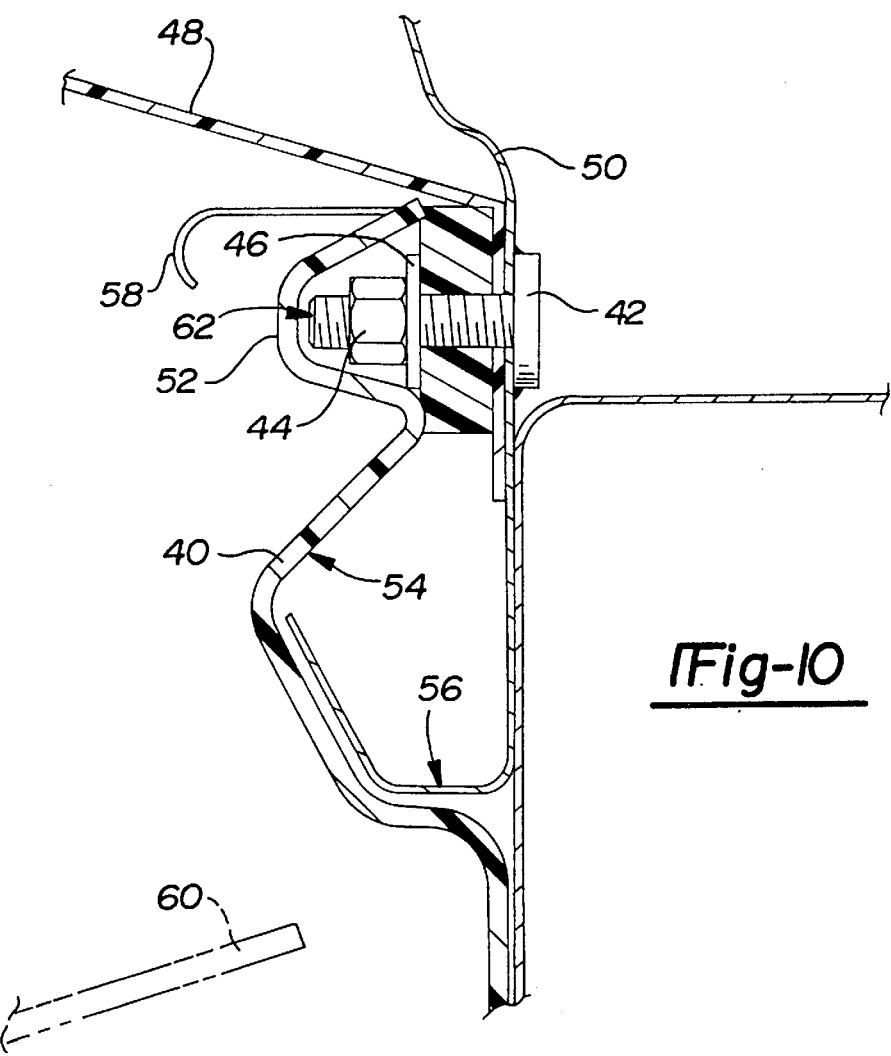
FIG. 10 is a sectional taken along lines 10—10 of FIG. 9.

Referring now to FIG. 9, the topwell assembly 22 is shown positioned in a vehicle body 34 with the rear wall 36 of the topwell assembly 22 being suitably secured to the upstanding back wall 38 of the vehicle body 34. As can be seen from FIG. 10, which presents a sectional taken along lines 10—10 of FIG. 9, the one piece topwell assembly 40 is installed over a weld stud 42 that has a hex nut 44 and washer 46 that secure the canvas convertible top 48 to the metal tacking strip 50 of the upstanding backwall 38.

The topwell assembly of the preferred embodiment has a tack strip stud cover 52 integrated into the shape of the one piece topwell 40, thereby hiding paint on the end 62 of the weld stud 42 that would not be aesthetically presentable. The back edge 54 of the one piece topwell 40 is formed inboard of water trough 56 and touch off to the tacking strip 50 with a formation covering the weld stud 42. The formation covering the stud 42 also has an interference with the metal deflector 58 holding the top of the topwell in place and providing a track for the backlite glass 60.

From the foregoing, it can be seen that a topwell for the topwell area of an automobile may be provided without utilizing vinyl that is assembled through a cut and sew fashion including snaps, grommets, and plastic extrusions, or vacuum formed high density polyethylene (HDPE). Rather a unitary topwell assembly is presented that implemented provides easy installation, reduced weight, improved fit and finish, substantial noise dampening capabilities, and reduced manufacturing and assembly costs.

While the principles of the invention in connection with the specific apparatus have been described, it is to be understood that the foregoing detailed description has been made by way of example only and not as a limitation to the scope of the invention as set forth in the accompanying claims.

What is claimed is:

1. A one piece topwell assembly attached to a structure of an automobile for receiving a retracted convertible top, comprising:

a needled-flat polyester fabric;

a lightweight thermoplastic material affixed to said needled polyester fabric; and said fabric affixed to a spun bonded polyester material to form a sheet, said sheet molded to form a one piece topwell.

2. The topwell assembly of claim 1, further comprising a laminating coating covering the lightweight thermoplastic material.

3. The topwell assembly of claim 1 wherein the lightweight thermoplastic material is a partially crystalline lightweight thermoplastic.

4. The topwell assembly of claim 1 wherein the needled-flat fabric is a polyester carpet.

5. The topwell assembly of claim 4 wherein the polyester carpet is a 9 ounce polyester carpet.

6. The topwell assembly of claim 3 wherein the partially crystalline lightweight thermoplastic is polyethylene.

7. The topwell assembly of claim 6 wherein the polyethylene is 18 ounce per square yard polyethylene.

8. The topwell assembly of claim 2 wherein the laminating coating is a tertiary spun bonded polyester material laminate.

9. The topwell assembly of claim 8 wherein the tertiary laminate is a 90 gram per square tertiary spun bonded polyester laminate.

* * * * *